United States Patent [19]

Nobuoka

[11] Patent Number: 5,534,919
[45] Date of Patent: Jul. 9, 1996

[54] IMAGE PICKUP APPARATUS FOR ESTIMATING A COMPLEMENTARY COLOR VALUE OF A TARGET PIXEL

[75] Inventor: Kousuke Nobuoka, Yokohama, Japan

[73] Assignee: Canon Kabushiki Kaisha, Tokyo, Japan

[21] Appl. No.: 225,780

[22] Filed: Apr. 11, 1994

[30] Foreign Application Priority Data

Apr. 15, 1993 [JP] Japan .................................. 5-088663

[51] Int. Cl.$^6$ ....................................... H04N 9/64
[52] U.S. Cl. ........................... 348/246; 348/242; 348/256
[58] Field of Search ........................ 348/242, 246, 348/235, 256, 258, 278, 280, 645, 647, 679; H04N 9/64

[56] References Cited

U.S. PATENT DOCUMENTS

| 3,684,825 | 8/1972 | Dischert et al. ....................... 348/679 |
| 4,642,678 | 2/1987 | Cok ......................................... 348/242 |
| 4,831,434 | 5/1989 | Fuchsberger ............................ 348/645 |
| 5,291,276 | 3/1994 | Matsumoto et al. .................... 348/645 |
| 5,327,228 | 7/1994 | Satyanarayana et al. ............. 348/647 |
| 5,327,246 | 7/1994 | Suzuki ..................................... 348/246 |
| 5,345,264 | 9/1994 | Murata et al. .......................... 348/235 |

*Primary Examiner*—Safet Metjahic
*Assistant Examiner*—Jeffrey S. Murrell
*Attorney, Agent, or Firm*—Fitzpatrick, Cella, Harper & Scinto

[57] ABSTRACT

In an image pickup apparatus, R, G and B three-primary-color signals are generated without reducing the saturation of colors and the band of the signals, while suppressing the generation of pseudocolors as much as possible, and image signals suitable for apparatuses, such as computers, printers and the like, are generated. A plurality of circuits for estimating the complementary-color value of a missing pixel are provided, and the output of one of the circuits is selected.

10 Claims, 5 Drawing Sheets

Wrc={(Yc-Y1)/(Y2-Y1)}*(Wr2-Wr1)+Wr1

Wrc=(Wr1+Wr2)/2

Wrc=Wr2+(Yc-Y1)*K

FIG.6(a)
PRIOR ART

|   |    |    |    |    |
|---|----|----|----|----|
| n    | Ye | Cy | Ye | Cy |
| n+1  | Mg | G  | Mg | G  |
| n+2  | Ye | Cy | Ye | Cy |
| n+3  | G  | Mg | G  | Mg |

FIG.6(b)
PRIOR ART

| | | | | |
|---|---|---|---|---|
| EVEN FIELD | Wr | Gb | Wr | Gb |
| ODD FIELD  | Wr | Gb | Wr | Gb |
| EVEN FIELD | Gr | Wb | Gr | Wb |
| ODD FIELD  | Gr | Wb | Gr | Wb |

IMAGE PICKUP APPARATUS FOR ESTIMATING A COMPLEMENTARY COLOR VALUE OF A TARGET PIXEL

BACKGROUND OF THE INVENTION

1. Field of the Invention

This invention relates to an image pickup apparatus.

2. Description of the Related Art

In a single-plate color video camera apparatus, in order to obtain color information from an image of a single image pickup device, color filters are arranged on a photosensitive surface in the form of a mosaic. Mg, Ye, Cy and G complementary-color mosaic filters, which are now most frequently used, are arranged as shown in FIG. 6(a) which shows pixel arrangement of complementary-color mosaic filters. A value corresponding to the spectral sensitivity characteristics of each complementary filter is obtained as an output from the image pickup device. When the camera is used as a movie camera for obtaining moving images, in order to conform to interlaced scanning standards, such as the NTSC or the like, signals obtained by adding pixel signals on the n-th line and the (n+1)-th line, on the (n+2)-th line and the (n+3)-th line, . . . are used for even fields, and signals obtained by adding pixel signals on the (n-1)-th line and the n-th line, on the (n+1)-th line and (n+2)-th line, . . . are used for odd fields. Accordingly, signals as shown in FIG. 6(b) which shows an output of an image pickup device are obtained as output signals from the image pickup device. In FIG. 6(b), Wr=Mg+Ye, Wb=Mg+Cy, Gr=G+Ye, and Gb=G+Cy. By performing interpolation by adjusting the spatial phases of respective Wr, Wb, Gr and Gb complementary-color signals, respective Wr, Wb, Gr and Gb complementary-color signals for one frame are generated. For example, as for Wr, when the output of the image pickup device is Wr, the Wr signal is used as it is. When the output of the image pickup device is other than Wr, the average of Wr's spatially adjacent to the target pixel (Wr's immediately before and after the target pixel, or Wr's on lines in the same field immediately before and after the line on which the target pixel is present, or Wr's in four oblique directions) is calculated to generate a Wr signal. Since the sampling frequency for each complementary-color signal is ½ of the pixel sampling frequency fs of the image pickup device, the band of the sampling frequency is limited so as to suppress folded components generated from a signal having a frequency of fs/2. By performing matrix calculation for complementary-color signals generated in the above-described manner, R, G and B three-primary-color signals are generated.

In the above-described conventional approach, theoretically, when separating/generating each complementary-color signal from the output of the image pickup device, carriers and folded components are generated as pseudo-color signals in vertical, horizontal and oblique directions for every frequency equal to ½ of the pixel sampling frequency fs by the image pickup device, thereby causing deterioration in the picture quality. In order to remove the above-described folded components, theoretically, each complementary-color signal must be separated/generated after limiting the band of the output signal of the image pickup device before separating/generating the complementary-color signal to ¼ of the pixel sampling frequency in vertical, horizontal and oblique directions. However, this approach cannot be adopted because a color modulation component is superposed in the output signal of the image pickup device.

Conventionally, in order to solve the above-described problems, in addition to the above-described R, G and B three-primary-color signals, signals obtained by removing the color modulation component included in the output of the image pickup device by an LPF (low-pass filter) are generated (if spectral sensitivity characteristics of complementary-color filters are ideal, the signals equal R+1.5 G+B, and the band can be allowed up to ½ of the pixel sampling frequency). By performing matrix calculation between the generated signals and the R, G and B three-primary-color signals, R, G and B three-primary-color signals having a wide band are generated. However, while the the wide-band R, G and B three-primary-color signals provide a finer image than an image provided by the original R, G and B three-primary-color signals, accuracy in colors is reduced, so that a whity image is obtained.

SUMMARY OF THE INVENTION

The present invention has been made in consideration of the above-described problems.

It is an object of the present invention to generate R, G and B three-primary-color signals without reducing the saturation of colors and the band of the signals and to suppress the generation of pseudocolors as much as possible. It is also an object of the present invention to provide an image which is more suitable as an input image for a multimedia computer, to which attention is being paid, and also for use in printing using a printer or the like.

The foregoing and other objects, advantages and features of the present invention will become more apparent from the following detailed description of the preferred embodiments taken in conjunction with the accompanying drawings.

BRIEF DESCRIPTION OF THE DRAWINGS

FIGS. 6(a) and 6(b) are diagrams illustrating a pixel arrangement of complementary-color mosaic filters.

DETAILED DESCRIPTION OF THE PREFERRED EMBODIMENT

Figure 1A:
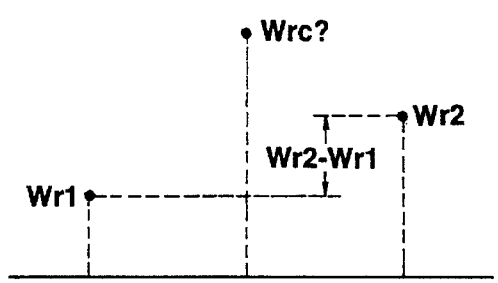
FIGS. 1(a) through 1(c) are diagrams illustrating methods for estimating a complementary-color value according to the present invention.
Figure 1A:
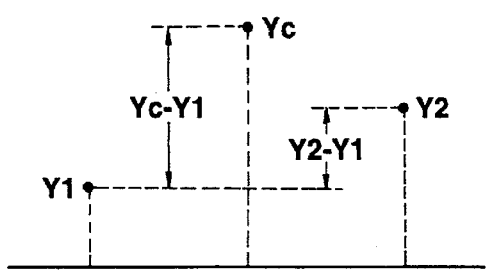

In one aspect of the present invention which achieves the above-described object, when estimating a missing complementary-color value for a pixel, attention is paid to variations in luminance signals near the pixel. The luminance signal indicates a signal obtained by removing a color modulation component included in a signal from an image pickup device by a LPF or the like, i.e., a signal obtained by performing linear calculation for the signal of the image pickup device. Accordingly, it can be considered that correlation between the luminance signal and respective Wr, Wb, Gr and Gb complementary-color values is high. A missing complementary-color value is estimated according to a procedure as shown in FIG. 1(a) which is a first method for estimating complementary-color value. For example, existing Wr's are represented by Wr1 and Wr2, and Wr to be estimated is represented by Wrc. Luminance values for the same pixels are represented by Y1, Y2 and Yc. Since correlation between Wr and Y is considered to be high, the ratio of Wrc with respect to Wr1 and Wr2 is considered to be the same as the ratio of Yc with respect to Y1 and Y2. That is, Wr1:Wrc:Wr2=Y1:Yc:Y2. Therefore, $$Wrc=\{(Yc-Y1)/(Y2-Y1)\}\times(Wr2-Wr1)+Wr1 \quad (1).$$

Figure 1B:
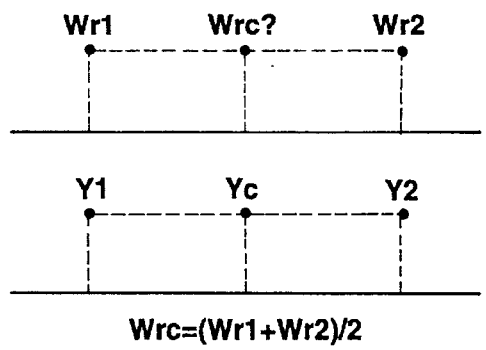

Problems in expression (1) are that expression (1) cannot be calculated or a large error is produced in expression (1) when Y2−Y1 equals zero or has a value close to zero, respectively, as shown in FIG. 1(b) which is a conventional method for estimating complementary-color value. Such problems arise for a flat image having substantially no variations in the luminance and color. For such an image, however, no problem arises even if a missing complementary-color value is estimated using the average of adjacent Wr's. Hence, $$Wrc=(Wr1+Wr2)/2 \quad (2).$$

Figure 1C:
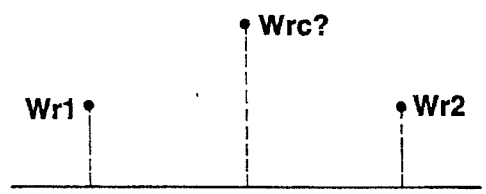
Figure 1C:
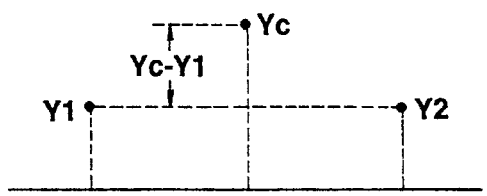

Problems arise both in expressions (1) and (2) when, as shown in FIG. 1(c), which is a second method for estimating complementary-color value, Y2−Y1 equals zero or has a value close to zero, and Yc−Y1 has a sufficiently large value. In such a case, a large error will be produced both in expressions (1) and (2). In order to solve such problems, in the present invention, an estimated value for Wrc is obtained by adding a value obtained by multiplying the value Yc−Y1 by an arbitrary coefficient K to Wr1.

$$Wrc=Wr1+(Yc-Y1)\times K \quad (3).$$

Characteristics of a low-pass filter for generating luminance signals used in expressions (1) and (3) are preferably as flat as possible in order to maintain the correlation between the luminance signals and respective complementary-color signals as high as possible.

By using complementary-color signals estimated by appropriately using expressions (1) through (3), it is possible to generate R, G and B three-primary-color signals without reducing the saturation of colors and the band of the signals, while suppressing the generation of pseudocolors as much as possible.

Figure 2:
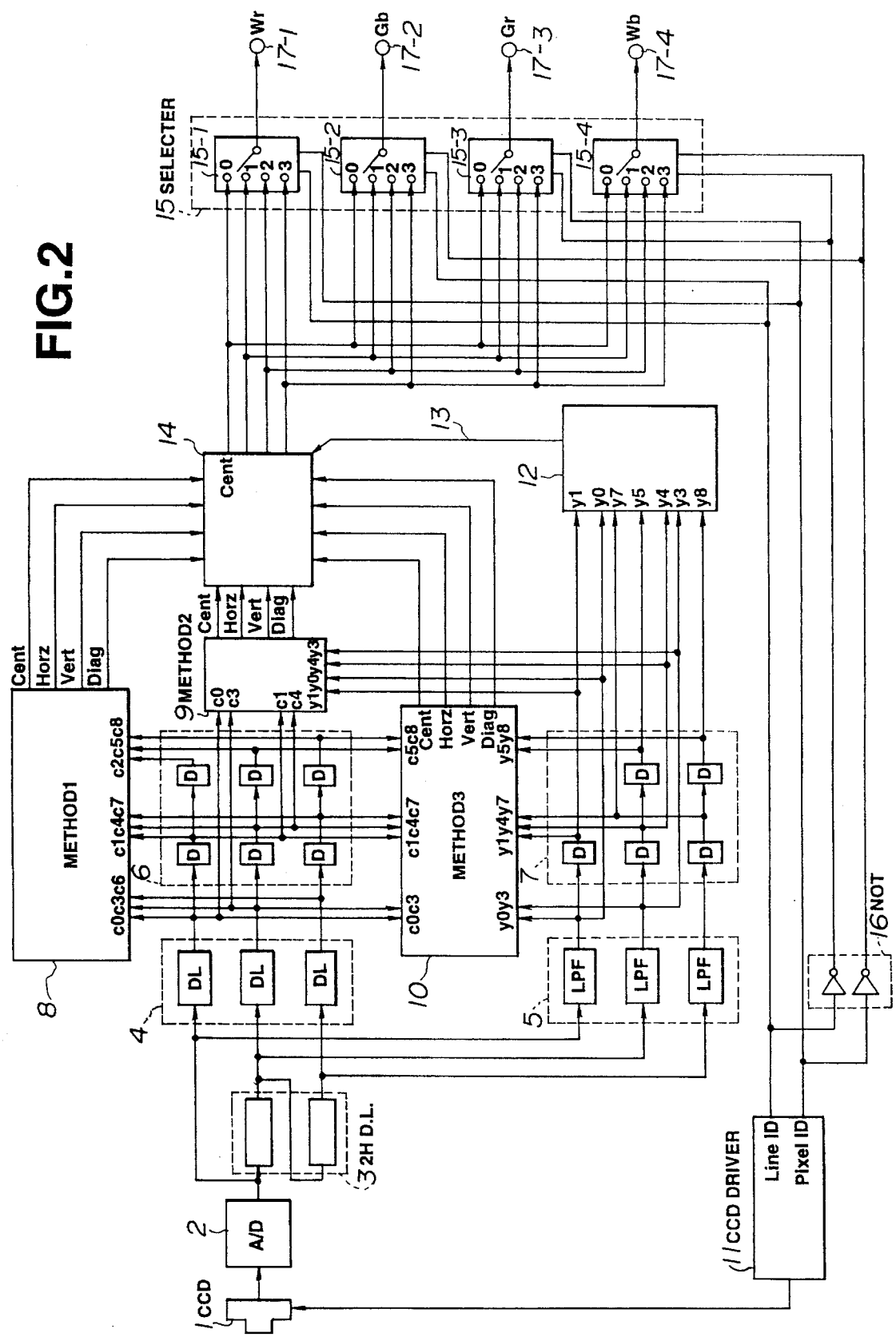
FIG. 2 is a block diagram illustrating circuitry according to an embodiment of the present invention.
Figure 3:
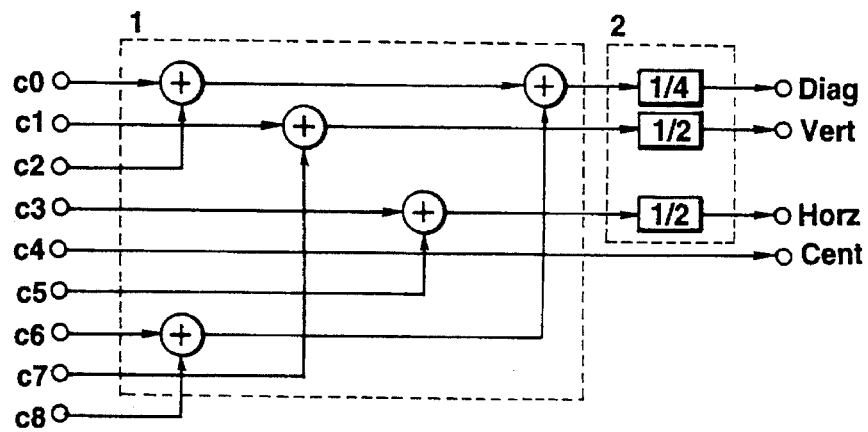
FIG. 3 is a diagram illustrating the configuration of a principal portion of FIG. 2.
Figure 4:
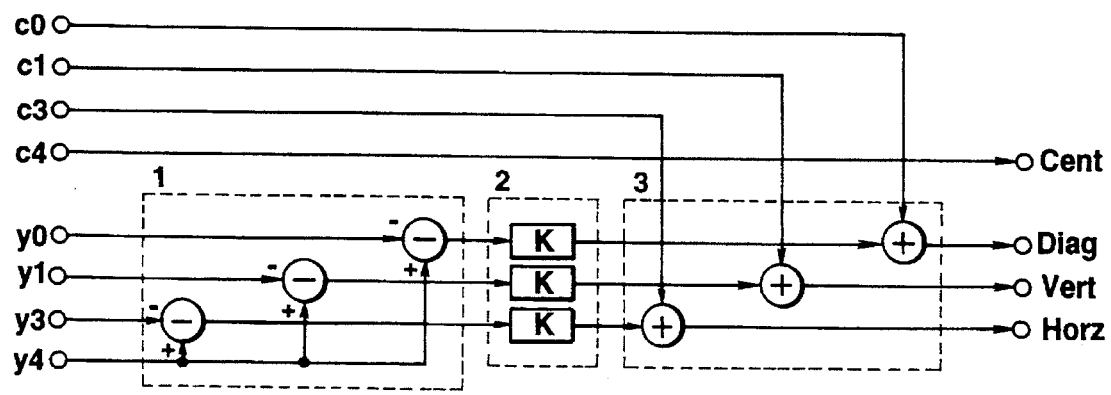
FIG. 4 is a diagram illustrating the configuration of another principal portion of FIG. 2.
Figure 5:
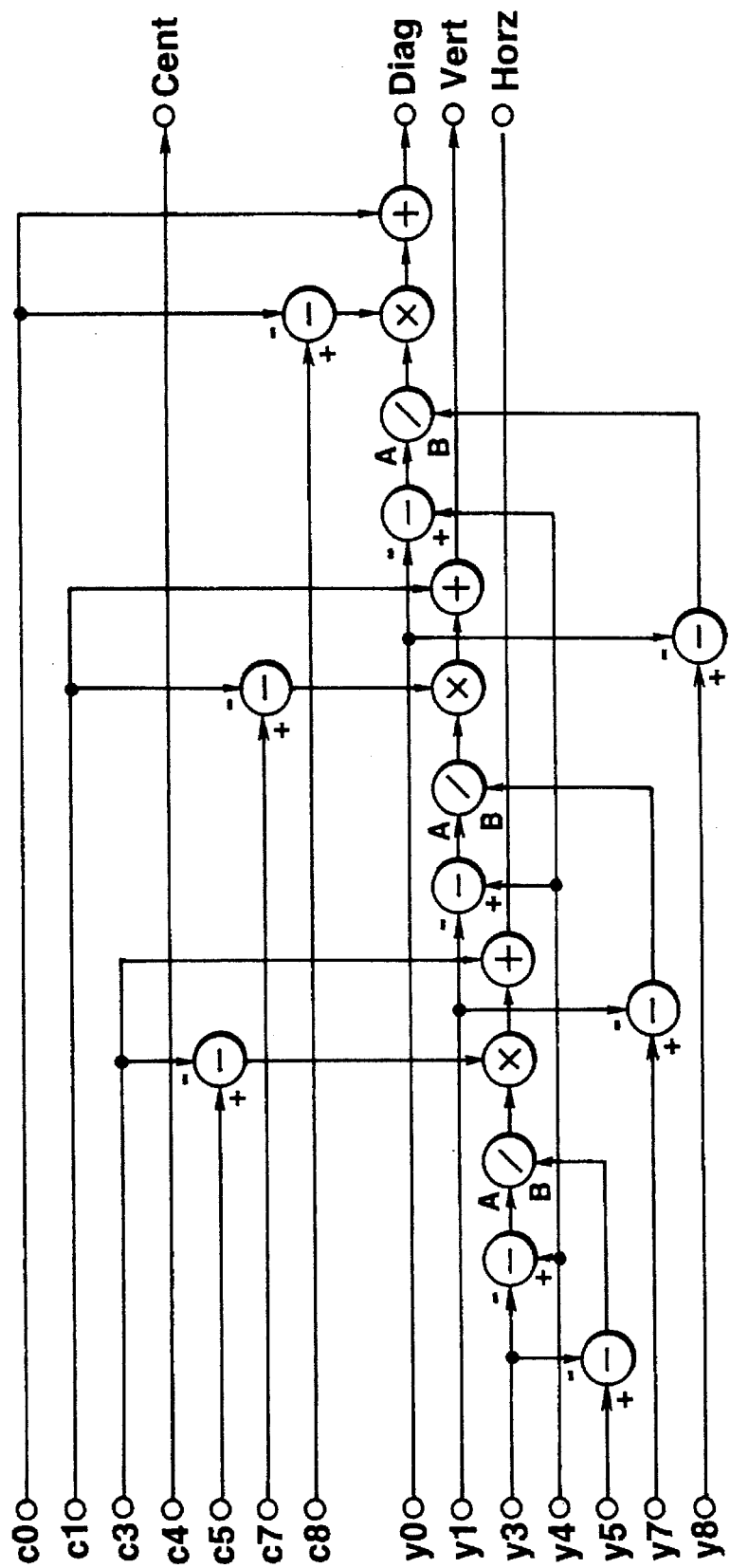
FIG. 5 is a diagram illustrating the configuration of still another principal portion of FIG. 2.

FIG. 2 illustrates circuitry according to an embodiment of the present invention. In FIG. 2, there are shown CCD (charge-coupled device) image pickup device 1, A/D converter 2, 2H delay lines 3, delay devices 4 for matching the phases of their output signals with the phases of signals delayed by low-pass filters 5, low-pass filters S, first delay devices 6, second delay devices 7, first complementary-color-value estimation means 8, second complementary-color-value estimation means 9, third complementary-color-value estimation means 10, CCD driver 11, condition determination means 12, control line 13, first switching means 14, second switching means 15, logic inverters 16, and output terminals 17-1–17-4. FIG. 3 illustrates an example of circuitry of first complementary-color-value estimation means 8 shown in FIG. 2. In FIG. 3, reference numeral 1 represents an addition circuit, and reference numeral 2 represents gain control means. FIG. 4 is an example of circuitry of second complementary-color-value estimation means 9 shown in FIG. 2. In FIG. 4, reference numeral 1 represents a subtraction circuit, reference numeral 2 represents gain control means, and reference numeral 3 represents an addition circuit. FIG. 5 illustrates an example of circuitry of third complementary-color-value estimation means 10 shown in FIG. 2.

The operation of the embodiment will now be described with reference to FIGS. 2 through 5. An image produced on the photosensitive surface of CCD image pickup device 1 is subjected to photoelectric conversion, and is converted into a digital image signal by A/D converter 2. The digital image signal is supplied to 2H delay lines 3, and CCD output signals for 3H including signals delayed by 1H and 2H are generated. The CCD output signals for 3H are branched to delay devices 4 and low-pass filters 5. Color modulation components included in the CCD output signals branched to low-pass filters 5 are removed, and the signals are converted into so-called luminance signals, which are supplied to second delay devices 7. The phases of the CCD output signals for 3H branched to delay devices 4 are adjusted with the phases of the output signals from low-pass filters 5, and the resultant signals are supplied to first pixel delay devices 6. CCD output signals and luminance signals delayed by one pixel and two pixels are held from among the CCD output signals for 3H and the luminance signals for 3H by delay devices 6 and 7. As for the CCD output signals, the current pixel value is represented by c0, the value delayed by one pixel is represented by c1, the value delayed by two pixels is represented by c2, the value delayed by 1H is represented by c3, the value delayed by 1H+one pixel is represented by c4, the value delayed by 1H+two pixels is represented by c5, the value delayed by 2H is represented by c6, the value delayed by 2H+one pixel is represented by c7, and the value delayed by 2H+two pixels is represented by c8. The value c4 is used as the central-pixel value. Similarly, as for the luminance signals, symbols y0, y1, y3, y4, y5, y6, y7 and y8 are used, and the value y4 is used as the central-pixel value. For the luminance signals, value y2 delayed by two pixels is not generated. The nine CCD output signal values are input to first complementary-color-value estimation means 8. Eight pixel values, i.e., c0, c1, c3, c4, y0, y1, y3 and y4, are input to second complementary-color-value estimation means 9. Fourteen pixel values, i.e., c0, c1, c3, c4, c5, c7, c8, y0, y1, y3, y4, y5, y7 and y8, are input to third complementary-color-value estimation means 10. First complementary-color-value estimation means 8, second complementary-color-value estimation means 9 and third complementary-color-value estimation means 10 perform estimations according to expressions (2), (3) and (1), respectively. The operations of the respective estimation means will be described later. Each of estimation means 8 through 10 outputs four values, i.e., central-pixel value "Cent", value "Horz" estimated from pixel values immediately before and after the central pixel, value "Vert" estimated from pixel values on lines preceding and succeeding the line of the central pixel by 1H, and value "Diag" estimated from pixel values in oblique directions from the central pixel, and supplies first switching means 14 with these values. Condition determination means 12 adaptively determines which of complementary-color values estimated by estimation means 8 through 10 must be used. Values y0, y1, y3, y4, y5, y7 and y8 are input to condition determination means 12. If an input image is flat, the difference between central-pixel value y4 and each of the values of surrounding pixels y0, y1, y3, y5, y7 and y8 equals zero or has a value close to zero. In such cases, if a complementary-color value is estimated according to expression (1), a large error is produced because the value of the denominator is close to zero. Accordingly, condition determination means 12 controls first switching means 14 through control line 13 so that a complementary-color value estimated by first complementary-color-value estimation means 8 is used. On the other hand, when the difference between central-pixel value y4 and each of the values of surrounding pixels y0, y1, y3, y5, y7 and y8 is sufficiently large, and the differences between values of surrounding pixels are also sufficiently large, expression (1) is used. Accordingly, condition determination means 12 controls first switching means 14 so that a complementary-color value estimated by third complementary-color-value estimation means 10 is used. When the differences between central-pixel value y4 and values of surrounding pixels y0, y1, y3, y5, y7 and y8 are sufficiently large, but the differences between values of surrounding pixels are close to zero, a large error is produced by expression (1) as well as by the conventional estimation method (expression (2)). In such a case, first switching means 14 is controlled by condition determination means 12 so that a complementary-color value estimated by second complementary-color-value estimation means 9 using expression (3) is used. Any of values Cent, Horz, Vert and Diag adaptively selected by first switching means 14 is supplied to second switching means 15. CCD driver 11 drives CCD image pickup device 1, and outputs a Line-ID signal which assumes a Low level on even lines and a High level on odd lines, and a Pixel-ID signal which assumes a Low level for even pixels and a High level for odd pixels. If it is assumed that the output signal of CCD image pickup device 1 comprises Wr, Gb, Wr, Gb, . . . on even lines, and Gr, Wb, Gr, WB, . . . on odd lines, for example, as for Wr, respective estimated values may be used in the sequence of Cent, Horz, Cent, Horz, . . . for even lines, and Vert, Diag, Vert, Diag, . . . for odd lines. Similarly, as for Gb, respective estimated values may be used in the sequence of Horz, Cent, Horz, Cent, . . . for even lines, and Diag, Vert, Diag, Vert, . . . for odd lines. As for Gr, respective estimated values may be used in the sequence of Vert, Diag, Vert, Diag, . . . for even lines, and Cent, Horz, Cent, Horz, . . . for odd lines. As for Wb, respective estimated values may be used in the sequence of Diag, Vert, Diag, Vert, . . . for even lines, and Horz, Cent, Horz, Cent, . . . for odd lines. Accordingly, switching means 15-1 for selecting Wr is controlled by a Line-ID signal and a Pixel-ID signal. Switching means 15-2 for selecting Gb is controlled by a Line-ID signal and a NOT(Pixel-ID) signal. Switching means 15-3 for selecting Gr is controlled by a NOT(Line-ID) signal and a Pixel-ID signal, and switching means 15-4 for selecting Wb is controlled by a NOT(line-ID) signal and a NOT(Pixel-ID) signal. As a result of the above-described operations, respective estimated complementary-color signals are output to output terminals 17-1 through 17-4.

Next, a more detailed description will be provided of the operation of first complementary-color-value estimation means 8 shown in FIG. 2 with reference to FIG. 3. In FIG. 3, Cent equals the input central-pixel value c4. Horz is a value obtained by adding pixel values c3 and c5 immediately before and after c4 and multiplying the sum by ½. Vert is a value obtained by adding pixel values c1 and c7 on lines preceding and succeeding the line of c4 by 1H and multiplying the sum by ½. Diag is a value obtained by adding pixel values c0, c2, c6 and c8 in four oblique directions of c4 and multiplying the sum by ¼. Thus, complementary-color-value estimation means, which has been frequently used, is realized.

The operation of second complementary-color-value estimation means 9 shown in FIG. 2 will be described with reference to FIG. 4. In FIG. 4, Cent equals the central-pixel value c4 of the input CCD signal. Horz is a value obtained by performing the calculation of expression (3) using the central-pixel value y4 of the input luminance signal, the luminance value y3 and the CCD signal value c3 of the pixel immediately before the central pixel. Vert is a value obtained by performing the calculation of expression (3) using the value y4, the luminance value y1 and the CCD signal value c1 of the pixel on the line preceding the line of y4 by 1H. Diag is a value obtained by performing the calculation of expression (3) using the value y4, the luminance value y0 and the CCD signal value c0 of the pixel immediately before y4 on the line preceding the line of y4 by 1H. According to the above-described operations, complementary-color-value estimation means based on expression (3) is realized.

Finally, the operation of third complementary-color-value estimation means 10 shown in FIG. 2 will be described with reference to FIG. 5. In FIG. 5, Cent equals the central-pixel value c4 of the CCD signal. Horz is a value obtained by performing the calculation of expression (1) using the central-pixel value y4 of the luminance signal, and the luminance values y3 and y5 and the CCD signal values c3 and c5 of pixels immediately before and after the central pixel. Vert is obtained by performing the calculation of expression (1) using the central-pixel value y4 of the luminance signal, and the luminance values y1 and y7 and the CCD signal values c1 and c7 of pixels on lines preceding and succeeding the line of the central pixel by 1H, and CCD signal values c1 and c7. Diag is obtained by performing the calculation of expression (1) using the central-pixel value y4 of the luminance signal, and values y0, y5, c0 and c8. According to the above-described operations, complementary-color-value estimation means based on expression (1) is realized.

Although in the present embodiment, three complementary-color-value estimation methods based on the above-described expressions (1), (2) and (3) are adaptively used, the present invention is not limited to such an approach. For example, only the estimation method based on expression (1) may be used, or only the estimation method based on expression (3) may be used.

As described above, according to the present invention, it is possible to generate R, G and B three-primary-color signals without reducing the saturation of colors and the band of the signals, while suppressing the generation of pseudocolors as much as possible.

Accordingly, if the present invention is applied, for example, to a single-plate video camera, a picture quality higher than in the conventional approach can be realized.

It is also possible to provide an input image suitable for a multimedia computer, a printer or the like with a better picture quality. Furthermore, when only the estimation method based on the above-described expression (3) is adopted, only one delay line is required while two delay lines are required in the conventional approach. As a result, it is possible to greatly reduce circuit scale and electric power consumption, and to prevent the generation of pseudocolors and a decrease in the saturation of colors.

The individual components shown in outline or designated by blocks in the drawings are all well known in the image pickup apparatus arts and their specific construction and operation are not critical to the operation or best mode for carrying out the invention.

While the present invention has been described with respect to what is presently considered to be the preferred embodiment, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A image pickup apparatus for interpolating a complementary color of a target pixel, said apparatus comprising:

image pickup means for photoconverting an optical image to form an image signal having a plurality of pixel signals;

first means for making an average of values of pixels having a same complementary color as that of the target pixel whose value is to be estimated and being adjacent to the target pixel, so as to output an estimated value of the complementary color of the target pixel;

second means for making a value obtained by multiplying a difference between a luminance value of the target pixel and a luminance value of a pixel having the same complementary color as that of the target pixel, and being adjacent to the target pixel, by an arbitrary coefficient and adding the result of the multiplication to a complementary-color value of the pixel having the same complementary color as that of the target pixel and being adjacent to the target pixel, so as to output an estimated value of the complementary color of the target pixel;

third means for making a value obtained by multiplying the ratio of a first difference, the first difference constituting the difference between a luminance value of the target pixel and a luminance value of a first pixel, adjacent to the target pixel, and having the same complementary color as that of the target pixel, to a second difference, the second difference constituting the difference between the luminance value of the first adjacent pixel and a luminance value of a second pixel having the same complementary color as that of the target pixel, by a difference between a complementary-color value of the first adjacent pixel and a complementary-color value of the second pixel, and adding the result of the multiplication to the complementary-color value of the first pixel, so as to output an estimated value of the complementary color of the target pixel; and selecting means for selecting which of said first, second and third means is to be used for estimating the value of the target pixel in a particular case.

2. An image pickup apparatus according to claim 1, wherein the apparatus switches between said first means, said second means and said third means.

3. An image pickup apparatus according to claim 1, wherein, when changes in the luminance values of pixels surrounding the target pixel and the luminance values of the target pixel itself are determined to be smaller than a predetermined value, said first means is used.

4. An image pickup apparatus according to claim 1, wherein, when changes in the luminance values of pixels surrounding the target pixel are smaller than a predetermined value, and changes in the luminance values of the target pixel and pixels surrounding the target pixel equal at least the predetermined value, said second means is used.

5. An image pickup apparatus according to claim 1, wherein, when changes in the luminance values of pixels surrounding and including the target pixel are determined to equal at least a predetermined value, said third means is used.

6. An image pickup apparatus, comprising:

a plurality of color filters intermittently disposed at a predetermined pitch;

detection means for detecting light via said color filters and outputting an image signal having a luminance signal and a color signal;

luminance-signal formation means for forming luminance signals from the image signal output from said detection means; and interpolation means for interpolating a signal present at a predetermined position in the output of said detection means with a signal of a first color present at an adjacent position, in accordance with the levels of the luminance signals, wherein said interpolation means changes the interpolation calculating method in accordance with the levels of the luminance signals.

7. An image pickup apparatus, comprising: a plurality of color filters intermittently disposed at a predetermined pitch;

detection means for detecting light via said color filters and outputting an image signal having a luminance signal and a color signal;

luminance-signal formation means for forming luminance signals form the image signal output from said detection means; and interpolation means for interpolating a signal present at a predetermined position in the output of said detection means with a signal of a first color present at an adjacent position, in accordance with the levels of the luminance signals, wherein said interpolation means changes the interpolation calculating method in accordance with the luminance level of the signal present at the predetermined position.

8. An image pickup apparatus according to claim 7, wherein said interpolation means refers to a luminance signal of a portion corresponding to the adjacent signal of the first color.

9. An apparatus for forming an interpolated image signal, said apparatus comprising:

image pickup means for photoconverting an optical image to form an image signal having a luminance signal and a color signal;

comparison means for comparing a luminance signal level of a pixel present at a predetermined position with respective luminance signal levels at a plurality of adjacent positions; and control means for switching between a first mode, utilizing first means for interpolating a value of the pixel present at the predetermined position by averaging signal levels of a first color present at the adjacent positions in accordance with the output of said comparison means, and a second mode, utilizing second means for interpolating a value of the pixel present at the predetermined position by averaging the signal levels of the first color present at the adjacent positions, in accordance with the output of said comparison means, while performing predetermined weighting on the respective signal levels to form an interpolated image signal.

10. An interpolation apparatus according to claim 9, wherein the first color is a complementary color.

* * * * *

UNITED STATES PATENT AND TRADEMARK OFFICE
CERTIFICATE OF CORRECTION

PATENT NO. : 5,534,919
DATED : July 9, 1996
INVENTOR(S) : KOUSUKE NOBUOKA

It is certified that error appears in the above-identified patent and that said Letters Patent is hereby corrected as shown below:

COLUMN 2

Line 12, "the the" should read --the--.

COLUMN 3

Line 53, "low-pass filters S," should be deleted.

COLUMN 5

Line 57, "cl" should read --c1--.

COLUMN 6

Line 7, "cl" should read --c1--.
Line 25, "cl" should read --c1--.
Line 27, "cl" should read --c1--.

COLUMN 7

Line 5, "A image" should read --An image--.

UNITED STATES PATENT AND TRADEMARK OFFICE
CERTIFICATE OF CORRECTION

PATENT NO. : 5,534,919

DATED : July 9, 1996

INVENTOR(S): KOUSUKE NOBUOKA

It is certified that error appears in the above-identified patent and that said Letters Patent is hereby corrected as shown below:

COLUMN 8

Line 18, "comprising: a plurality" should read
--comprising:
    a plurality--.

Line 24, "form" should read --from--.

Signed and Sealed this

Nineteenth Day of November, 1996

BRUCE LEHMAN

*Attest:*

*Attesting Officer*          *Commissioner of Patents and Trademarks*